United States Patent
Lee et al.

(10) Patent No.: US 12,317,937 B2
(45) Date of Patent: Jun. 3, 2025

(54) AEROSOL-GENERATING DEVICE AND OPERATION METHOD THEREOF

(71) Applicant: KT&G CORPORATION, Daejeon (KR)

(72) Inventors: Jongsub Lee, Sungnam-si (KR); Minkyu Kim, Seoul (KR); Jueon Park, Seoul (KR); Byungsung Cho, Gwangmyung-si (KR)

(73) Assignee: KT&G CORPORATION, Daejeon (KR)

( * ) Notice: Subject to any disclaimer, the term of this patent is extended or adjusted under 35 U.S.C. 154(b) by 347 days.

(21) Appl. No.: 17/799,825

(22) PCT Filed: Jan. 25, 2022

(86) PCT No.: PCT/KR2022/001305
§ 371 (c)(1),
(2) Date: Aug. 15, 2022

(87) PCT Pub. No.: WO2022/169174
PCT Pub. Date: Aug. 11, 2022

(65) Prior Publication Data
US 2023/0329353 A1    Oct. 19, 2023

(30) Foreign Application Priority Data

Feb. 8, 2021   (KR) .................. 10-2021-0017688

(51) Int. Cl.
*A24F 40/57* (2020.01)
*A24F 40/10* (2020.01)
(Continued)

(52) U.S. Cl.
CPC .............. *A24F 40/57* (2020.01); *A24F 40/10* (2020.01); *A24F 40/51* (2020.01); *G05D 23/1917* (2013.01)

(58) Field of Classification Search
CPC .......... A24F 40/57; A24F 40/10; A24F 40/51; A24F 40/65; A24F 40/44; A24F 40/46; A24F 40/60; G05D 23/1917
See application file for complete search history.

(56) References Cited

U.S. PATENT DOCUMENTS 10,045,567 B2 * 8/2018 Monsees ............... A61M 15/06
10,045,568 B2 * 8/2018 Monsees ............... A61M 15/06
(Continued)

FOREIGN PATENT DOCUMENTS

CN    103974638    8/2014
CN    108143009    6/2018
(Continued)

OTHER PUBLICATIONS

Japan Patent Office Application No. 2022-550236, Office Action dated Jul. 11, 2023, 4 pages.
(Continued)

*Primary Examiner* — Edwin A. Leon
(74) *Attorney, Agent, or Firm* — LEE, HONG, DEGERMAN, KANG & WAIMEY

(57) ABSTRACT

An aerosol-generating device including a wick configured to absorb an aerosol-generating substance, a heater configured to heat the wick, a sensor configured to sense a puff, and a controller. The controller performs control to heat the heater while puffs are sensed, and detects the temperature of the heater. Based on the temperature of the heater being equal to or higher than a predetermined threshold temperature, the controller interrupts the supply of power to the heater. Based on the temperature of the heater being lower than the threshold temperature, the controller determines whether it is necessary to change the threshold temperature. Based on (Continued)

a need to change the threshold temperature, the controller changes the threshold temperature based on the detected temperature of the heater.

10 Claims, 9 Drawing Sheets

(51) Int. Cl.
    *A24F 40/51*     (2020.01)
    *G05D 23/19*     (2006.01)

(56) References Cited

U.S. PATENT DOCUMENTS

| | | | |
|---|---|---|---|
| 10,058,130 B2 * | 8/2018 | Monsees | A24F 40/42 |
| 2015/0237916 A1 | 8/2015 | Farine et al. | |
| 2016/0345628 A1 | 12/2016 | Sabet | |
| 2017/0265524 A1 | 9/2017 | Cadieux et al. | |
| 2020/0000150 A1 | 1/2020 | Rothwell | |
| 2020/0107405 A1 | 4/2020 | Kondo | |
| 2020/0245688 A1 | 8/2020 | Yamada et al. | |

FOREIGN PATENT DOCUMENTS

| | | |
|---|---|---|
| CN | 108886839 | 11/2018 |
| CN | 109068749 | 12/2018 |
| CN | 109562239 | 4/2019 |
| CN | 110418582 | 11/2019 |
| CN | 111278304 | 6/2020 |
| CN | 111278308 | 6/2020 |
| CN | 111372481 | 7/2020 |
| CN | 112165872 | 1/2021 |
| CN | 112839536 | 5/2021 |
| EP | 3701816 | 9/2020 |
| GB | 2533652 | 6/2016 |
| JP | 2007218797 | 8/2007 |
| JP | 2009295329 | 12/2009 |
| JP | 2010097740 | 4/2010 |
| JP | 2014232002 | 12/2014 |
| JP | 2015-531600 | 11/2015 |
| KR | 10-2020-0090214 | 7/2020 |
| KR | 10-2020-00126588 | 11/2020 |
| KR | 10-2020-0126864 | 11/2020 |
| WO | 2019173923 | 9/2019 |
| WO | 2020213917 | 10/2020 |

OTHER PUBLICATIONS

Korean Intellectual Property Office Application No. 10-2021-0017688, Notice of Allowance dated Jan. 13, 2023, 2 pages.
PCT International Application No. PCT/KR2022/001305, International Search Report dated May 9, 2022, 4 pages.
European Patent Office Application Serial No. 22741144.4, Search Report dated Dec. 6, 2024, 12 pages.
State Intellectual Property Office of the People's Republic of China Application Serial No. 202280002533.6, Office Action dated Dec. 31, 2024, 10 pages.

* cited by examiner

AEROSOL-GENERATING DEVICE AND OPERATION METHOD THEREOF

CROSS-REFERENCE TO RELATED APPLICATIONS

This application is the National Stage filing under 35 U.S.C. 371 of International Application No. PCT/KR2022/001305, filed on Jan. 25, 2022, which claims the benefit of earlier filing date and right of priority to Korean Application No. 10-2021-0017688, filed on Feb. 8, 2021, the contents of which are all hereby incorporated by reference herein their entirety.

TECHNICAL FIELD

The present disclosure relates to an aerosol-generating device and an operation method thereof.

BACKGROUND ART

An aerosol-generating device is a device that extracts certain components from a medium or a substance by forming an aerosol. The medium may contain a multicomponent substance. The substance contained in the medium may be a multicomponent flavoring substance. For example, the substance contained in the medium may include a nicotine component, an herbal component, and/or a coffee component. Recently, various research on aerosol-generating devices has been conducted. Recently, various research on aerosol-generating devices has been conducted.

DISCLOSURE OF INVENTION

Technical Problem

It is an object of the present disclosure to solve the above and other problems.

It is another object of the present disclosure to provide an aerosol-generating device and an operation method thereof capable of preventing carbonization of a wick in consideration of manufacturing tolerance.

It is still another object of the present disclosure to provide an aerosol-generating device and an operation method thereof capable of heating a heater to a desired temperature in consideration of variance in the resistance value of a heater attributable to manufacturing tolerance.

Solution to Problem

An aerosol-generating device according to an aspect of the present disclosure for accomplishing the above and other objects may include a wick configured to absorb an aerosol-generating substance, a heater configured to heat the wick, a sensor configured to sense a puff, and a controller. The controller may perform control to heat the heater while puffs are sensed, and may detect the temperature of the heater. When the temperature of the heater is equal to or higher than a predetermined threshold temperature, the controller may interrupt the supply of power to the heater. When the temperature of the heater is lower than the threshold temperature, the controller may determine whether it is necessary to change the threshold temperature. When it is necessary to change the threshold temperature, the controller may change the threshold temperature based on the detected temperature of the heater.

An operation method of an aerosol-generating device according to an aspect of the present disclosure for accomplishing the above and other objects may include heating a heater of the aerosol-generating device to heat a wick absorbing an aerosol-generating substance while puffs are sensed, detecting the temperature of the heater, interrupting the supply of power to the heater when the temperature of the heater is equal to or higher than a predetermined threshold temperature, determining whether it is necessary to change the threshold temperature when the temperature of the heater is lower than the threshold temperature, and changing the threshold temperature based on the detected temperature of the heater when it is necessary to change the threshold temperature.

Advantageous Effects of Invention

According to at least one of embodiments of the present disclosure, it is possible to prevent carbonization of a wick due to heating by a heater even when the amount of aerosol-generating substance that is absorbed in the wick varies due to manufacturing tolerance.

According to at least one of embodiments of the present disclosure, it is possible to heat the heater to a desired temperature in spite of variance in the resistance value of the heater due to manufacturing tolerance.

Additional applications of the present disclosure will become apparent from the following detailed description. However, because various changes and modifications will be clearly understood by those skilled in the art within the spirit and scope of the present disclosure, it should be understood that the detailed description and specific embodiments, such as preferred embodiments of the present disclosure, are merely given by way of example.

BRIEF DESCRIPTION OF DRAWINGS

The above and other objects, features, and other advantages of the present disclosure will be more clearly understood from the following detailed description taken in conjunction with the accompanying drawings, in which.

BEST MODE FOR CARRYING OUT THE INVENTION

Figure 1:
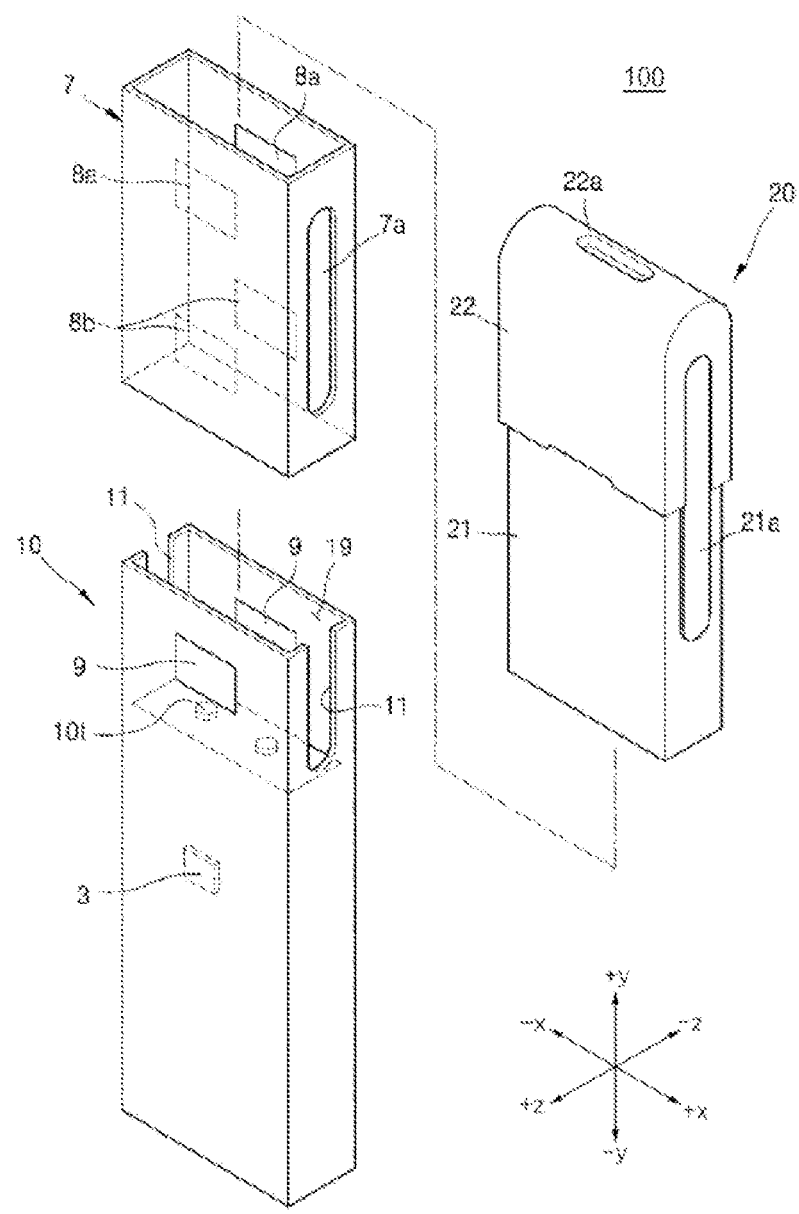
FIGS. 1 to 5 are views for explaining an aerosol-generating device according to embodiments of the present disclosure.

Hereinafter, the embodiments disclosed in the present specification will be described in detail with reference to the accompanying drawings. The same or similar elements are denoted by the same reference numerals even though they are depicted in different drawings, and redundant descriptions thereof will be omitted.

In the following description, with respect to constituent elements used in the following description, the suffixes "module" and "unit" are used only in consideration of facilitation of description. The "module" and "unit" are do not have mutually distinguished meanings or functions.

In addition, in the following description of the embodiments disclosed in the present specification, a detailed description of known functions and configurations incorporated herein will be omitted when the same may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents, and substitutions within the scope and sprit of the present disclosure.

It will be understood that the terms "first", "second", etc., may be used herein to describe various components. However, these components should not be limited by these terms. These terms are only used to distinguish one component from another component.

It will be understood that when a component is referred to as being "connected to" or "coupled to" another component, it may be directly connected to or coupled to another component. However, it will be understood that intervening components may be present. On the other hand, when a component is referred to as being "directly connected to" or "directly coupled to" another component, there are no intervening components present.

As used herein, the singular form is intended to include the plural forms as well, unless the context clearly indicates otherwise.

Hereinafter, directions of an aerosol-generating device are defined based on the orthogonal coordinate system shown in FIGS. 1 to 5. In the orthogonal coordinate system, the x-axis direction may be defined as the rightward and leftward direction of the aerosol-generating device. Here, based on the origin, the +x-axis direction may mean the rightward direction, and the −x-axis direction may mean the leftward direction. Furthermore, the y-axis direction may be defined as the upward and downward direction of the aerosol-generating device. Here, based on the origin, the +y-axis direction may mean the upward direction, and the −y-axis direction may mean the downward direction. In addition, the z-axis direction may be defined as the forward and backward direction of the aerosol-generating device. Here, based on the origin, the +z-axis direction may mean the forward direction, and the −z-axis direction may mean the backward direction.

Referring to FIG. 1, an aerosol-generating device 100 according to an embodiment of the present disclosure may include a main body 10 and/or a cartridge 20.

The cartridge 20 may be coupled to the main body 10. The cartridge 20 may be mounted to the main body 10 in a manner such that a portion of the cartridge 20 is inserted into an accommodation space 19 in the main body 10.

The cartridge 20 may contain therein an aerosol-generating substance. For example, the cartridge 20 may contain therein an aerosol-generating substance in one of a liquid state, a solid state, a gaseous state, and a gel state. The aerosol-generating substance may include a liquid composition. For example, the liquid composition may be a liquid including a tobacco-containing material having a volatile tobacco flavor component, or may be a liquid including a non-tobacco material.

For example, the liquid composition may include one component selected from among water, solvents, ethanol, plant extracts, spices, flavorings, and vitamin mixtures, or a mixture of these components. The spices may include menthol, peppermint, spearmint oil, and various fruit-flavored ingredients, but the present disclosure is not limited thereto. The flavorings may include ingredients capable of providing various flavors or tastes to a user. The vitamin mixtures may be a mixture of at least one of vitamin A, vitamin B, vitamin C, or vitamin E, but the present disclosure is not limited thereto. In addition, the liquid composition may include an aerosol-forming agent such as glycerin or propylene glycol.

For example, the liquid composition may include a solution of glycerin and propylene glycol at any weight ratio, to which nicotine salts are added. The liquid composition may include two or more types of nicotine salts. Nicotine salts may be formed by adding suitable acids, including organic or inorganic acids, to nicotine. The nicotine may be naturally generated nicotine or synthetic nicotine, and may account for any proportion of the total weight of the liquid composition.

Acid for formation of the nicotine salts may be appropriately selected in consideration of the rate of nicotine absorption in the blood, the operating temperature of the aerosol-generating device 100, the flavors or tastes, the solubility, or the like. For example, the acid for formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid, and malic acid, or may be a mixture of two or more acids selected from the above-described group. However, the present disclosure is not limited thereto.

The cartridge 20 may be operated by an electrical signal or a wireless signal transmitted from the main body 10 to perform a function of generating an aerosol by converting the phase of the aerosol-generating substance in the cartridge 20 to a gaseous phase. The term "aerosol" may refer to a gas in which vaporized particles generated from the aerosol-generating substance are mixed with air.

For example, in response to the electrical signal from the main body 10, the cartridge 20 may convert the phase of the aerosol-generating substance by heating the aerosol-generating substance using an ultrasonic vibration method or an induction-heating method. In another example, the cartridge 20 may include its own power source, and may operate in response to an electrical control signal or a wireless signal received from the main body 10 to generate an aerosol.

The cartridge 20 may include a liquid storage 21 accommodating the aerosol-generating substance therein and an atomizer performing a function of converting the aerosol-generating substance in the liquid storage 21 into an aerosol.

When the liquid storage 21 "accommodates the aerosol-generating substance" therein, it includes both the case in which the liquid storage 21 functions as a container that simply contains the aerosol-generating substance and the case in which the liquid storage 21 contains therein an element impregnated with (i.e. containing) the aerosol-generating substance, such as a sponge, cotton, fabric, or porous ceramic structure.

For example, the atomizer may include a wick for absorbing the aerosol-generating substance and maintaining the same in an optimal state for conversion into an aerosol and a heater for heating the wick to generate an aerosol.

For example, the wick may include at least one of a cotton fiber, a ceramic fiber, a glass fiber, or porous ceramic.

The heater may include a metallic material such as copper, nickel, or tungsten to heat the aerosol-generating substance delivered to the wick by generating heat using electrical resistance. The heater may be implemented as, for example, a metal wire, a metal plate, a ceramic heating element, or the like, or may be implemented as a conductive filament using a material such as a nichrome wire. The heater may be wound around or disposed adjacent to the wick.

The atomizer may be implemented as a heating element in the form of a mesh or plate, which performs both a function of absorbing the aerosol-generating substance without using a separate wick and maintaining the same in an optimal state for conversion into an aerosol and a function of heating the aerosol-generating substance to generate an aerosol.

At least a portion of the liquid storage 21 of the cartridge 20 may include a transparent material so that the aerosol-generating substance accommodated in the cartridge may be visually identified from the outside. The liquid storage 21 may include a protruding window 21a, which protrudes from the liquid storage 21 so as to be inserted into a groove 11 in the main body 10 when the liquid storage 21 is coupled to the main body 10. A mouthpiece 22 and the liquid storage 21 may be entirely made of transparent plastic or glass. Alternatively, only the protruding window 21a, which is a part of the liquid storage 21, may be made of a transparent material.

The main body 10 may include a connection terminal 10t, which is disposed in the accommodation space 19. When the liquid storage 21 of the cartridge 20 is inserted into the accommodation space 19 in the main body 10, the main body 10 may provide power to the cartridge 20 or may supply a signal related to operation of the cartridge 20 to the cartridge 20 through the connection terminal 10t.

The mouthpiece 22 may be coupled to one end of the liquid storage 21 of the cartridge 20. The mouthpiece 22 may be the part of the aerosol-generating device 100 that is inserted into the mouth of a user. The mouthpiece 22 may have formed therein a discharge hole 22a to discharge an aerosol generated from the aerosol-generating substance in the liquid storage 21 to the outside.

A slider 7 may be coupled to the main body 10 so as to be movable relative to the main body 10. The slider 7 may function to cover or expose at least a portion of the mouthpiece 22 of the cartridge 20, which is coupled to the main body 10, by moving relative to the main body 10. The slider 7 may have formed therein an elongated hole 7a to expose at least a portion of the protruding window 21a of the cartridge 20 to the outside.

The slider 7 may have the shape of a hollow container with both ends opened. However, the structure of the slider 7 is not limited to the shape of the hollow container shown in the drawings. For example, the slider 7 may have the structure of a bent plate that has a clip-shaped cross-section, which is movable relative to the main body 10 while being coupled to the edge of the main body 10, or may have the structure of a curved semi-cylinder that has a curved arc-shaped cross-section.

The slider 7 may include a magnetic body for maintaining the position of the slider 7 with respect to the main body 10 and the cartridge 20. The magnetic body may include a permanent magnet or a material such as iron, nickel, cobalt, or an alloy thereof.

The magnetic body may include two first magnetic bodies 8a, which face each other with the inner space in the slider 7 interposed therebetween, and two second magnetic bodies 8b, which face each other with the inner space in the slider 7 interposed therebetween. The first magnetic bodies 8a may be disposed so as to be spaced apart from the second magnetic bodies 8b in the direction in which the slider 7 moves, that is, the longitudinal direction of the main body 10, in which the main body 10 extends.

The main body 10 may include a fixed magnetic body 9, which is disposed along the route along which the first magnetic bodies 8a and the second magnetic bodies 8b of the slider 7 move as the slider 7 moves relative to the main body 10. The main body 10 may include a plurality of fixed magnetic bodies 9, which are disposed so as to face each other with the accommodation space 19 interposed therebetween.

The slider 7 may be stably maintained at positions at which the slider 7 covers or exposes an end portion of the mouthpiece 22 by the magnetic force acting between the fixed magnetic bodies 9 and the first magnetic bodies 8a or between the fixed magnetic bodies 9 and the second magnetic bodies 8b depending on changes in the position of the slider 7.

The main body 10 may include a position change detection sensor 3 for sensing a change in the position of the slider 7. The position change detection sensor 3 may be disposed along the route along which the first magnetic bodies 8a and the second magnetic bodies 8b of the slider 7 move as the slider 7 moves relative to the main body 10.

The position change detection sensor 3 may sense magnetization of a magnetic material or a change in the direction or intensity of a magnetic field. The position change detection sensor 3 may be, for example, a Hall effect sensor, a rotating coil, a magnetoresistor, or a superconducting quantum interference device (SQUID), but the present disclosure is not limited thereto.

In the aerosol-generating device 100 according to the above-described embodiment, the cross-sectional shape of each of the main body 10, the cartridge 20, and the slider 7 when viewed from a direction transverse to the longitudinal direction thereof may be substantially the shape of a rectangle that includes two long sides, which extend along surfaces facing each other, and two short sides, which are shorter than the long sides and interconnect both ends of one of the long sides and both ends of the other one of the long sides. However, the present disclosure is not limited to any specific shape of the aerosol-generating device 100. The aerosol-generating device 100 may have, for example, a circular, elliptical, square, or any other polygonal cross-sectional shape.

Also, the aerosol-generating device 100 is not necessarily limited to a structure that extends linearly in the longitudinal direction. For example, the aerosol-generating device 100 may be elongated while being curved in a streamlined shape or bent at a predetermined angle at a specific portion thereof so as to be easily held by a user.

Figure 2:
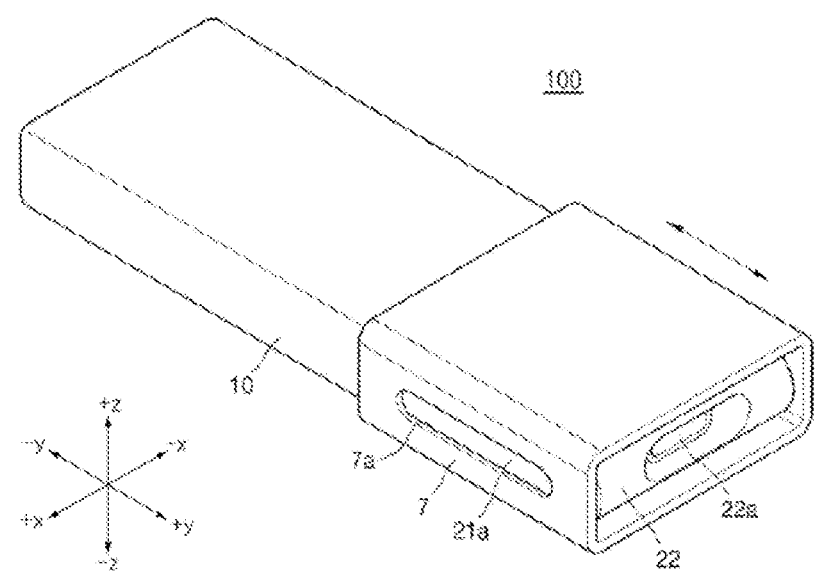

Referring to FIG. 2, when the slider 7 moves to a position at which the end portion of the mouthpiece 22 is covered (hereinafter referred to as a "first position") in the state in which the cartridge 20 is coupled to the main body 10, the mouthpiece 22 may be safely protected from external foreign substances and may be kept clean by the slider 7.

The user may check the remaining amount of aerosol-generating substance contained in the cartridge 20 by visually checking the protruding window 21a of the cartridge 20 through the elongated hole 7a in the slider 7.

Figure 3:
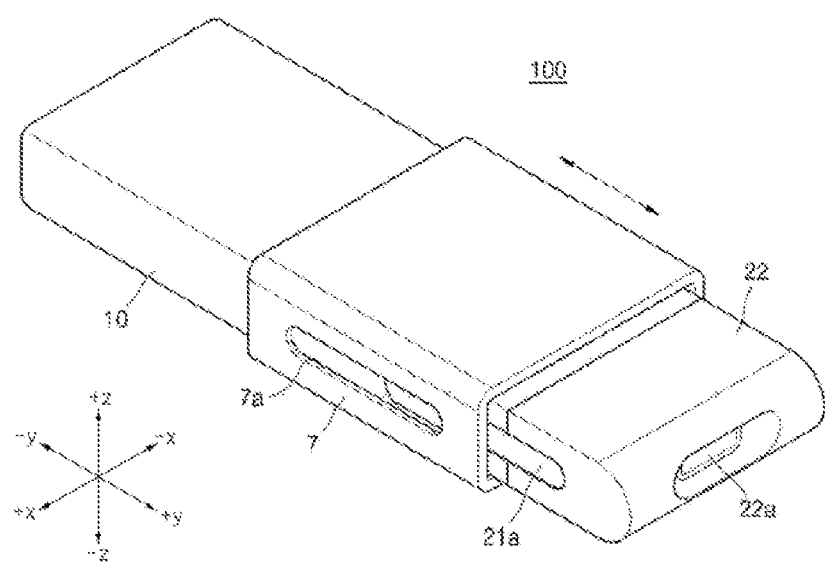

Referring to FIG. 3, when the slider 7 moves to a position at which the end portion of the mouthpiece 22 is exposed to the outside (hereinafter referred to as a "second position") in the state in which the cartridge 20 is coupled to the main body 10, the end portion of the mouthpiece 22 may be inserted into the mouth of the user, and the user may inhale the aerosol discharged through the discharge hole 22a in the mouthpiece 22.

Since the protruding window 21a of the cartridge 20 is still exposed to the outside through the elongated hole 7a in the slider 7 when the slider 7 moves to the second position, the user may visually check the remaining amount of aerosol-generating substance contained in the cartridge 20.

Figure 4:
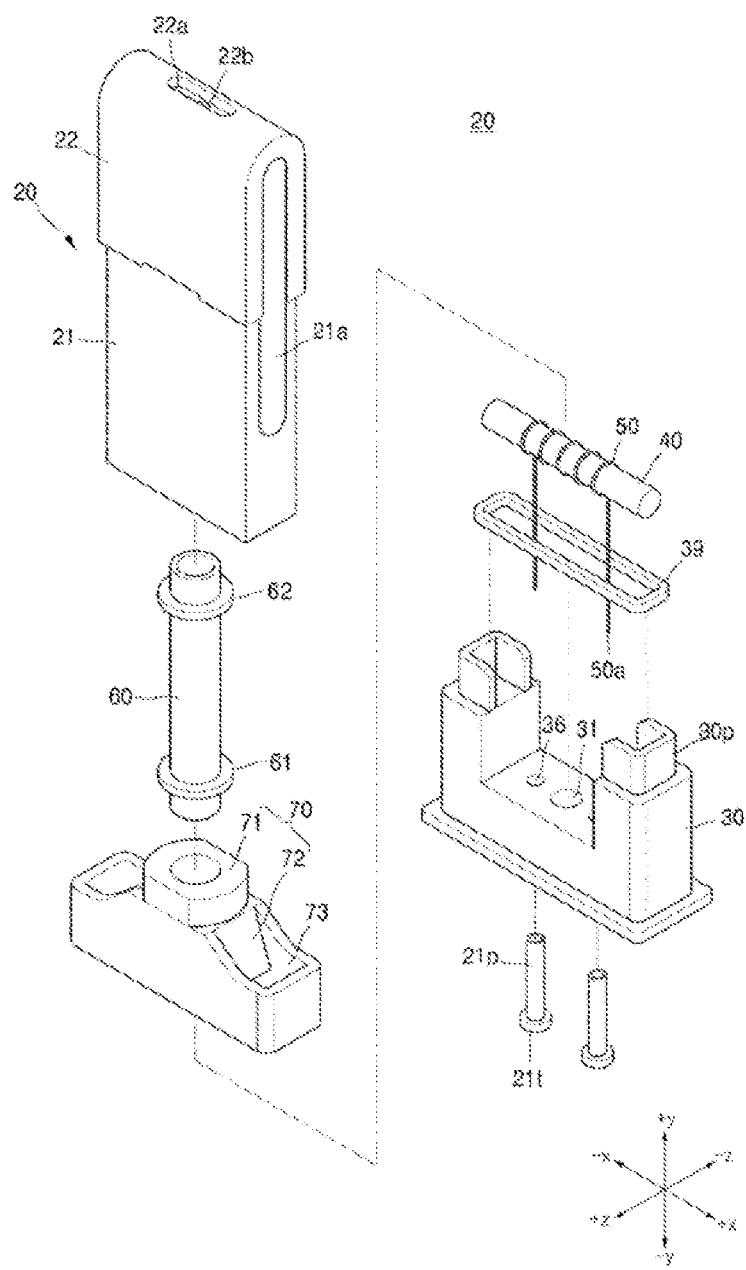
Figure 5:
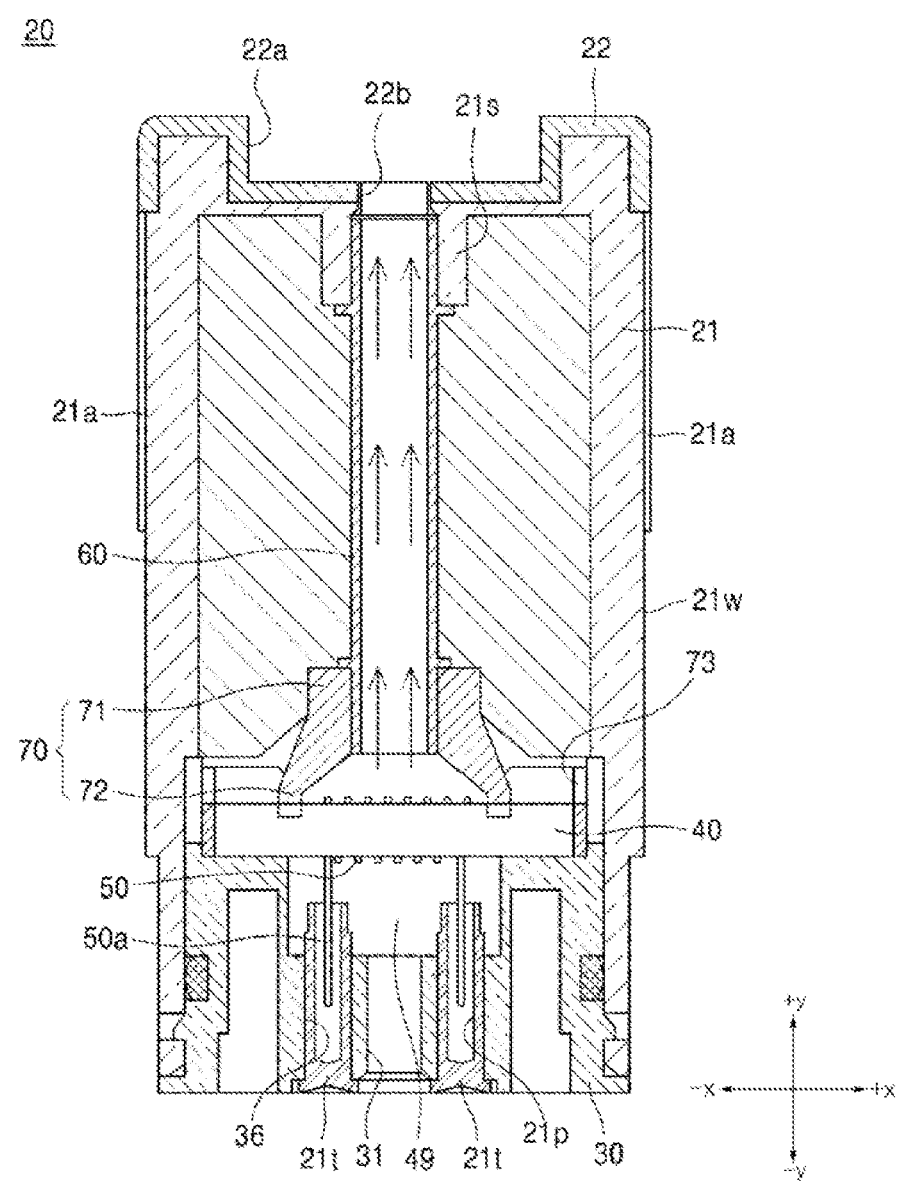

Referring to FIGS. 4 and 5, the atomizer included in the cartridge 20 may include a wick 40, which absorbs the aerosol-generating substance, a heater 50, which heats the aerosol-generating substance absorbed in the wick 40, and/or a lower cap 30, which supports the wick 40 and the heater 50 and forms a chamber 49.

The wick 40 may be maintained in the state in which the aerosol-generating substance is absorbed therein. When the wick 40 is heated by the heater 50, the aerosol-generating substance absorbed in the wick 40 may be vaporized to generate an aerosol.

The structures of the lower cap 30, the wick 40, and/or the heater 50 shown in the drawings are merely illustrative, and may be modified in various other forms. For example, the heater 50 may be disposed adjacent to the wick 40, rather than being wound around the wick 40, or may be inserted into the wick 40. For example, the wick 40 may be formed in the shape of a mesh or a plate. For example, the wick 40 and the heater 50 may be integrated into one component, for example, a mesh-shaped heater made of a metallic material.

The mouthpiece 22 may be coupled to one end portion of the liquid storage 21, and the lower cap 30 may be coupled to the other end portion of the liquid storage 21. The lower cap 30 may function not only to support the wick 40 and the heater 50 but also to seal the other end portion of the liquid storage 21. The lower cap 30 may include support protrusions 30p formed on the upper end thereof to support both end portions of the wick 40.

The lower cap 30 may be inserted into the other end portion of the liquid storage 21. A sealing ring 39 may be disposed between the lower cap 30 and the liquid storage 21. For example, the sealing ring 39 may be made of an elastic material such as rubber or silicone.

The lower cap 30 may include an air passage 31 for delivering air to the chamber 49. The air passing through the air passage 31 in the lower cap 30 may be supplied to the wick 40 disposed in the chamber 49.

A delivery pipe 60 may be disposed inside the liquid storage 21 in order to connect the chamber 49 to the discharge hole 22a in the mouthpiece 22. The aerosol generated in the chamber 49 may be delivered to the discharge hole 22a through the delivery pipe 60. For example, one end of the delivery pipe 60 may be connected to the chamber 49, and the other end of the delivery pipe 60 may be connected to the discharge hole 22a in the mouthpiece 22.

Although the delivery pipe 60 is illustrated in the drawings as being disposed along the center axis line of the liquid storage 21 in the longitudinal direction, in which the liquid storage 21 extends, the present disclosure is not limited thereto. For example, the delivery pipe 60 may be disposed so as to be biased toward an edge of the liquid storage 21.

A pressing part 70 may be disposed between the delivery pipe 60 and the wick 40. The pressing part 70 may be disposed between the end of the delivery pipe 60, which faces the chamber 49, and the wick 40 to press the wick 40 in the downward direction.

The sealing ring 39 may be disposed between the lower cap 30 and the pressing part 70.

The pressing part 70 may include a connection pipe 71, which surrounds one end of the delivery pipe 60 and connects the end of the delivery pipe 60 to the chamber 49.

The liquid storage 21 may include a support pipe 21s, which surrounds the other end of the delivery pipe 60 inside the liquid storage 21 and connects the other end of the delivery pipe 60 to the discharge hole 22a.

The delivery pipe 60 may include flanges 61 and 62 formed at both end portions thereof. The flanges 61 and 62 may protrude outwards from the outer surface of the delivery pipe 60. The delivery pipe 60 may be securely supported between the chamber and the discharge hole 22a by the flanges 61 and 62 formed at both ends thereof.

The pressing part 70 may include a contact portion 72, which extends from the outer side of the connection pipe 71 toward the wick 40 so as to be in contact with the wick 40, and a substance delivery hole 73, which is open in the upward-downward direction outside the contact portion 72 in order to deliver the aerosol-generating substance contained in the liquid storage 21 to the wick 40.

The wick 40 may be formed in a cylindrical shape, and the surface of the contact portion 72, which is in contact with the wick 40, may have a curved shape corresponding to the shape of the outer surface of the wick 40.

A terminal 21t for electrical connection to the main body 10 may be disposed at the lower end of the liquid storage 21 of the cartridge 20 so as to be exposed to the outside. For example, the terminal 21t may be mounted to the lower end portion of the lower cap 30. The terminal 21t may be disposed so as to be exposed to the outside of the lower cap 30. The power supplied from the main body 10 may be transmitted to the heater 50 through the terminal 21t. The terminal 21t may include a coupling pipe 21p, which protrudes toward the chamber 49 through a terminal passage 36 in the lower cap 30. The coupling pipe 21p may be securely coupled to an end portion of the heater 50.

Figure 6:
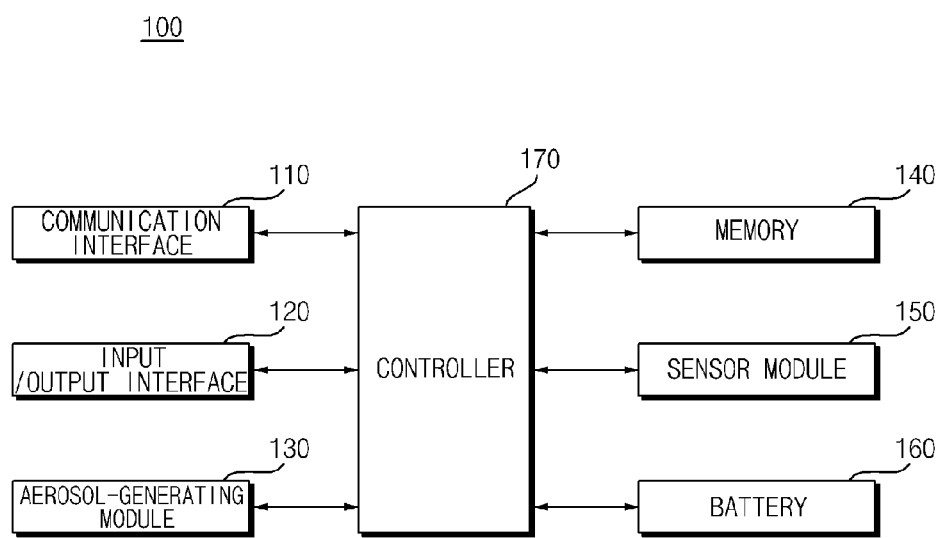
FIG. 6 is a block diagram of an aerosol-generating device according to an embodiment of the present disclosure.

FIG. 6 is a block diagram of an aerosol-generating device according to an embodiment of the present disclosure.

Referring to FIG. 6, an aerosol-generating device 100 may include a communication interface 110, an input/output interface 120, an aerosol-generating module 130, a memory 140, a sensor module 150, a battery 160, and/or a controller 170.

In one embodiment, the aerosol-generating device 100 may be composed of a main body 10 and a cartridge 20. In this case, the components included in the aerosol-generating device 100 may be located in at least one of the main body 10 or the cartridge 20.

The communication interface 110 may include at least one communication module for communication with an external device and/or a network. For example, the communication interface 110 may include a communication module for wired communication, such as a Universal Serial Bus (USB). For example, the communication interface 110 may include a communication module for wireless communication, such as Wireless Fidelity (Wi-Fi), Bluetooth, Bluetooth Low Energy (BLE), ZigBee, or nearfield communication (NFC).

The input/output interface 120 may include an input device (not shown) for receiving a command from a user and/or an output device (not shown) for outputting information to the user. For example, the input device may include a touch panel, a physical button, a microphone, or the like. For example, the output device may include a display device for outputting visual information, such as a display or a light-emitting diode (LED), an audio device for outputting auditory information, such as a speaker or a buzzer, a motor for outputting tactile information such as haptic effect, or the like.

The input/output interface 120 may transmit data corresponding to a command input by the user through the input device to another component (or other components) of the aerosol-generating device 100. The input/output interface 120 may output information corresponding to data received from another component (or other components) of the aerosol-generating device 100 through the output device.

The aerosol-generating module 130 may generate an aerosol from an aerosol-generating substance. Here, the aerosol-generating substance may be a substance in a liquid state, a solid state, or a gel state, which is capable of generating an aerosol, or a combination of two or more aerosol-generating substances.

According to an embodiment, the liquid aerosol-generating substance may be a liquid including a tobacco-containing material having a volatile tobacco flavor component. According to another embodiment, the liquid aerosol-generating substance may be a liquid including a non-tobacco material. For example, the liquid aerosol-generating substance may include water, solvents, nicotine, plant extracts, flavorings, flavoring agents, vitamin mixtures, etc.

The solid aerosol-generating substance may include a solid material based on a tobacco raw material such as a reconstituted tobacco sheet, shredded tobacco, or granulated tobacco. In addition, the solid aerosol-generating substance may include a solid material having a taste control agent and a flavoring material. For example, the taste control agent may include calcium carbonate, sodium bicarbonate, calcium oxide, etc. For example, the flavoring material may include a natural material such as herbal granules, or may include a material such as silica, zeolite, or dextrin, which includes an aroma ingredient.

In addition, the aerosol-generating substance may further include an aerosol-forming agent such as glycerin or propylene glycol.

The aerosol-generating module 130 may include at least one heater.

The aerosol-generating module 130 may include an electro-resistive heater. For example, the electro-resistive heater may include at least one electrically conductive track. The electro-resistive heater may be heated as current flows through the electrically conductive track. At this time, the aerosol-generating substance may be heated by the heated electro-resistive heater.

The electrically conductive track may include an electro-resistive material. In one example, the electrically conductive track may be formed of a metal material. In another example, the electrically conductive track may be formed of a ceramic material, carbon, a metal alloy, or a composite of a ceramic material and metal.

The electro-resistive heater may include an electrically conductive track that is formed in any of various shapes. For example, the electrically conductive track may be formed in a coil shape.

The aerosol-generating module 130 may include a heater that uses an induction-heating method. For example, the induction heater may include an electrically conductive coil. The induction heater may generate an alternating magnetic field, which periodically changes in direction, by adjusting the current flowing through the electrically conductive coil. At this time, when the alternating magnetic field is applied to a magnetic body, energy loss may occur in the magnetic body due to eddy current loss and hysteresis loss. In addition, the lost energy may be released as thermal energy. Accordingly, the aerosol-generating substance located adjacent to the magnetic body may be heated. Here, an object that generates heat due to the magnetic field may be referred to as a susceptor.

Meanwhile, the aerosol-generating module 130 may generate ultrasonic vibrations to thereby generate an aerosol from the aerosol-generating substance.

The aerosol-generating device 100 may be referred to as a cartomizer, an atomizer, or a vaporizer.

The memory 140 may store programs for processing and controlling each signal in the controller 170, and may store processed data and data to be processed.

For example, the memory 140 may store applications designed for the purpose of performing various tasks that can be processed by the controller 170. The memory 140 may selectively provide some of the stored applications in response to the request from the controller 170.

For example, the memory 140 may store data on the operation time of the aerosol-generating device 100, the maximum number of puffs, the current number of puffs, at least one temperature profile, and at least one electric power profile. Here, "puff" means inhalation by the user. "inhalation" means the user's act of taking air or other substances into the user's oral cavity, nasal cavity, or lungs through the user's mouth or nose.

The memory 140 may include at least one of volatile memory (e.g. dynamic random access memory (DRAM), static random access memory (SRAM), or synchronous dynamic random access memory (SDRAM)), nonvolatile memory (e.g. flash memory), a hard disk drive (HDD), or a solid-state drive (SSD).

The sensor module 150 may include at least one sensor.

For example, the sensor module 150 may include a sensor for sensing a puff (hereinafter referred to as a "puff sensor"). In this case, the puff sensor may be implemented as a proximity sensor, a pressure sensor, a gyro sensor, an acceleration sensor, a magnetic field sensor, or the like.

For example, the sensor module 150 may include a sensor for sensing the temperature of the heater included in the aerosol-generating module 130 and the temperature of the aerosol-generating substance (hereinafter referred to as a "temperature sensor"). In this case, the heater included in the aerosol-generating module 130 may also serve as the temperature sensor. For example, the electro-resistive material of the heater may be a material having a predetermined temperature coefficient of resistance. The sensor module 150 may measure the resistance of the heater, which varies according to the temperature, to thereby sense the temperature of the heater.

For example, the sensor module 150 may include a sensor for sensing mounting/demounting of the cartridge 20 (hereinafter referred to as a "cartridge detection sensor").

In this case, the cartridge detection sensor may be implemented as an inductance-based sensor, a capacitive sensor, a resistance sensor, or a Hall sensor (or Hall IC) using a Hall effect.

For example, the sensor module 150 may include a voltage sensor for sensing a voltage applied to a component (e.g. the battery 160) provided in the aerosol-generating device 100 and/or a current sensor for sensing a current.

For example, the sensor module 150 may include a sensor for sensing the position of the slider 7 (e.g., the position change detection sensor 3 of FIG. 1).

The battery 160 may supply electric power used for the operation of the aerosol-generating device 100 under the control of the controller 170. The battery 160 may supply electric power to other components provided in the aerosol-generating device 100. For example, the battery 160 may supply electric power to the communication module included in the communication interface 110, the output device included in the input/output interface 120, and the heater included in the aerosol-generating module 130.

The battery 160 may be a rechargeable battery or a disposable battery. For example, the battery 160 may be a lithium-ion (Li-ion) battery, a lithium polymer (Li-polymer) battery or a lithium-ion phosphate battery. However, the present disclosure is not limited thereto. For example, the battery 160 may be a lithium cobalt oxide (LiCoO2) battery, a lithium titanate battery, and the like.

The aerosol-generating device 100 may further include a battery protection circuit module (PCM) (not shown), which is a circuit for protecting the battery 160. The battery protection circuit module (PCM) may be disposed adjacent to the upper surface of the battery 160. For example, in order to prevent overcharging and overdischarging of the battery 160, the battery protection circuit module (PCM) may cut off the electrical path to the battery 160 when a short circuit occurs in a circuit connected to the battery 160, when an overvoltage is applied to the battery 160, or when an overcurrent flows through the battery 160.

The aerosol-generating device 100 may further include a charging terminal to which electric power supplied from the outside is input. For example, the charging terminal may be formed at one side of the main body 10 of the aerosol-generating device 100. The aerosol-generating device 100 may charge the battery 160 using electric power supplied through the charging terminal. In this case, the charging terminal may be configured as a wired terminal for USB communication, a pogo pin, or the like.

The aerosol-generating device 100 may further include a power terminal (not shown) to which electric power supplied from the outside is input. For example, a power line may be connected to the power terminal, which is disposed at one side of the main body 10 of the aerosol-generating device 100. The aerosol-generating device 100 may use the electric power supplied through the power line connected to the power terminal to charge the battery 160. In this case, the power terminal may be a wired terminal for USB communication.

The aerosol-generating device 100 may wirelessly receive electric power supplied from the outside through the communication interface 110. For example, the aerosol-generating device 100 may wirelessly receive electric power using an antenna included in the communication module for wireless communication. The aerosol-generating device 100 may charge the battery 160 using the wirelessly supplied electric power.

The controller 170 may control the overall operation of the aerosol-generating device 100. The controller 170 may be connected to each of the components provided in the aerosol-generating device 100. The controller 170 may transmit and/or receive a signal to and/or from each of the components, thereby controlling the overall operation of each of the components.

The controller 170 may include at least one processor. The controller 170 may control the overall operation of the aerosol-generating device 100 using the processor included therein. Here, the processor may be a general processor such as a central processing unit (CPU). Of course, the processor may be a dedicated device such as an application-specific integrated circuit (ASIC), or may be any of other hardware-based processors.

The controller 170 may perform any one of a plurality of functions of the aerosol-generating device 100. For example, the controller 170 may perform any one of a plurality of functions of the aerosol-generating device 100 (e.g. a preheating function, a heating function, a charging function, and a cleaning function) according to the state of each of the components provided in the aerosol-generating device 100 and the user's command received through the input/output interface 120.

The controller 170 may control the operation of each of the components provided in the aerosol-generating device 100 based on data stored in the memory 140. For example, the controller 170 may control the supply of a predetermined amount of electric power from the battery 160 to the aerosol-generating module 130 for a predetermined time based on the data on the temperature profile stored in the memory 140.

The controller 170 may determine the occurrence or non-occurrence of a puff using the puff sensor included in the sensor module 150. For example, the controller 170 may check a temperature change, a flow change, a pressure change, and a voltage change in the aerosol-generating device 100 based on the values sensed by the puff sensor. The controller 170 may determine the occurrence or non-occurrence of a puff based on the value sensed by the puff sensor.

The controller 170 may control the operation of each of the components provided in the aerosol-generating device 100 according to the occurrence or non-occurrence of a puff and/or the number of puffs. For example, upon determining that a puff has occurred, the controller 170 may perform control such that electric power is supplied to the heater.

The controller 170 may perform control such that electric power is supplied to the heater using at least one of a pulse width modulation (PWM) method or a proportional-integral-differential (PID) method.

For example, the controller 170 may perform control such that a current pulse having a predetermined frequency and a predetermined duty ratio is supplied to the heater using the PWM method. In this case, the controller 170 may control the amount of electric power supplied to the heater by adjusting the frequency and the duty ratio of the current pulse.

For example, the controller 170 may determine a target temperature to be controlled based on the temperature profile. In this case, the controller 170 may control the amount of electric power supplied to the heater using the PID method, which is a feedback control method using a difference value between the temperature of the heater and the target temperature, a value obtained by integrating the difference value with respect to time, and a value obtained by differentiating the difference value with respect to time.

Although the PWM method and the PID method are described as examples of methods of controlling the supply of electric power to the heater, the present disclosure is not limited thereto, and may employ any of various control methods, such as a proportional-integral (PI) method or a proportional-differential (PD) method.

The controller 170 may perform control such that the supply of electric power to the heater is interrupted according to a predetermined condition. For example, the controller 170 may perform control such that the supply of electric power to the heater is interrupted when the cartridge 20 is demounted, when the number of puffs reaches the predetermined maximum number of puffs, when a puff is not sensed during a predetermined period of time or longer, or when the remaining capacity of the battery 160 is less than a predetermined value.

The controller 170 may calculate the remaining capacity with respect to the full charge capacity of the battery 160.

For example, the controller 170 may calculate the remaining capacity of the battery 160 based on the values sensed by the voltage sensor and/or the current sensor included in the sensor module 150.

The controller 170 may determine whether the cartridge 20 is mounted to the main body 10 using the cartridge detection sensor. For example, the cartridge detection sensor may include a connection terminal 10t included in the main body 10. The controller 170 may determine whether the cartridge 20 is mounted to the main body 10 based on the current flowing through the connection terminal 10t.

The controller 170 may determine the position of the slider 7 using the position change detection sensor 3, and may change modes according to the position of the slider 7. For example, when the slider 3 moves from the first position to the second position, the controller 170 may set the mode of the aerosol-generating device 100 to a preheating mode, in which an operation related to a preheating function is performed. For example, when the slider 3 moves from the second position to the first position, the controller 170 may set the mode of the aerosol-generating device 100 to a standby mode, in which the supply of power to the aerosol-generating module 130 is interrupted.

Upon determining that the cartridge 20 has been mounted to the main body 10 using the cartridge detection sensor, the controller 170 may determine the position of the slider 7 using the position change detection sensor 3.

Figure 7:
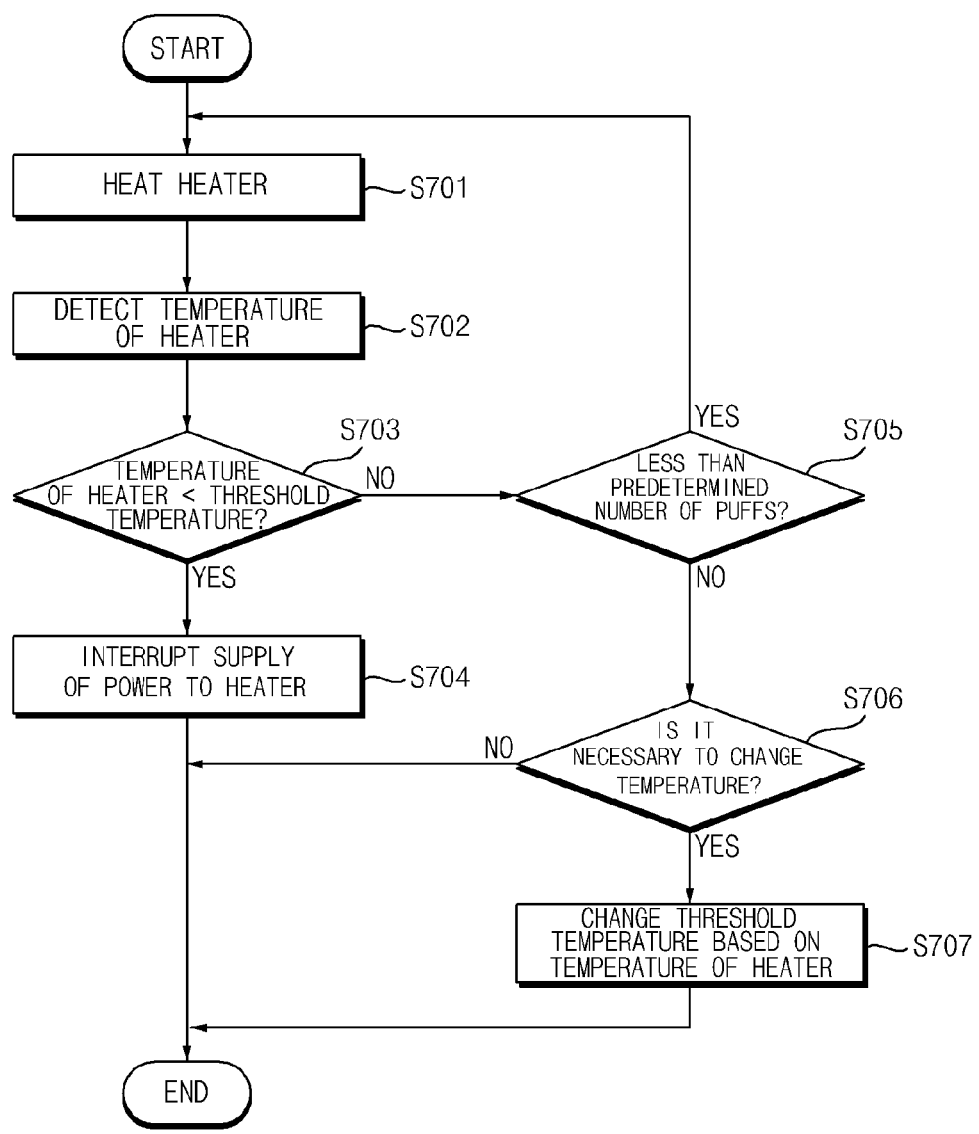
FIGS. 7 to 10 are views for explaining an operation method of an aerosol-generating device according to embodiments of the present disclosure.

FIG. 7 is a flowchart of an operation method of the aerosol-generating device according to an embodiment of the present disclosure.

Referring to FIG. 7, the aerosol-generating device 100 may heat the heater 50 in operation S701. For example, the aerosol-generating device 100 may control components such that a predetermined amount of power is supplied to the heater 50 according to a predetermined temperature profile while puffs are sensed by the puff sensor included in the sensor module 150.

The aerosol-generating device 100 may detect the temperature of the heater 50 in operation S702. For example, the aerosol-generating device 100 may detect the temperature of the heater 50 based on the resistance value of the heater 50, which varies depending on changes in temperature.

The aerosol-generating device 100 may determine whether the detected temperature of the heater 50 is lower than a predetermined threshold temperature in operation S703. Here, the predetermined threshold temperature may be the lowest temperature at which the wick 40 may be carbonized by heating by the heater 50, regardless of whether the aerosol-generating substance contained in the cartridge 20 is exhausted.

When the detected temperature of the heater 50 is equal to or higher than the predetermined threshold temperature, the aerosol-generating device 100 may interrupt the supply of power to the heater 50 in operation S704. That is, when the temperature of the heater 50 is equal to or higher than the predetermined threshold temperature, the aerosol-generating device 100 may stop the heating operation by the heater 50 to prevent carbonization of the wick 40.

When the detected temperature of the heater 50 is lower than the predetermined threshold temperature, the aerosol-generating device 100 may determine whether the number of sensed puffs is equal to or greater than a predetermined number of puffs in operation S705. For example, the aerosol-generating device 100 may count the number of puffs from the time of sensing of the first puff, and may determine whether the counted number of puffs is equal to or greater than the predetermined number of puffs.

The aerosol-generating device 100 may store the detected temperature of the heater 50 in the memory 140. For example, the aerosol-generating device 100 may store the maximum value of the temperature of the heater 50, which is detected while puffs are sensed, in the memory 140 for each puff section.

When the number of sensed puffs is equal to or greater than the predetermined number of puffs, the aerosol-generating device 100 may determine whether it is necessary to change the predetermined threshold temperature in operation S706.

For example, when the difference between the predetermined threshold temperature and the maximum value of the temperature detected while the heater 50 is heated is equal to or less than a predetermined temperature difference, the aerosol-generating device 100 may determine that it is necessary to change the threshold temperature.

For example, when the difference between the predetermined threshold temperature and a representative value (e.g. an average value or a median value) of the maximum values stored in the memory 140 is equal to or less than a predetermined temperature difference, the aerosol-generating device 100 may determine that it is necessary to change the threshold temperature.

For example, among the maximum values stored in the memory 140, when the number of maximum values, each of which is different from the predetermined threshold temperature by a predetermined temperature difference or less, is equal to or greater than a predetermined number, the aerosol-generating device 100 may determine that it is necessary to change the threshold temperature.

When it is necessary to change the predetermined threshold temperature, the aerosol-generating device 100 may change the threshold temperature based on the detected temperature of the heater 50 in operation S707.

For example, the aerosol-generating device 100 may change the threshold temperature to the maximum value of the temperature detected while the heater 50 is heated.

For example, the aerosol-generating device 100 may change the threshold temperature to the largest maximum value, among the maximum values stored in the memory 140.

For example, the aerosol-generating device 100 may change the threshold temperature to a representative value of the maximum values stored in the memory 140, for example, an average value of the maximum values.

Even if the aerosol-generating device 100 is manufactured of the same material and in the same dimensions (e.g. length or cross-sectional area), an error may occur in the manufacture of the components included in the aerosol-generating device 100 due to various factors. For example, when the degree to which the wick 40 is pressed in the downward direction by the pressing part 70 included in the cartridge 20 falls outside a reference range due to manufacturing tolerance, for example, when the degree to which the wick 40 is pressed by the pressing part 70 is greater than a predetermined reference, the amount of aerosol-generating substance that is absorbed in the wick 40 per unit time may decrease.

When the aerosol-generating device 100 heats the heater 50 in response to a puff without considering manufacturing tolerance, the heater 50 may be heated in the state in which an insufficient amount of the aerosol-generating substance is absorbed in the wick 40. In this case, the temperature of the heater 50 may increase, and the wick 40 may dry more quickly and may thus be carbonized more easily than when a sufficient amount of the aerosol-generating substance is absorbed in the wick 40.

Figure 8:
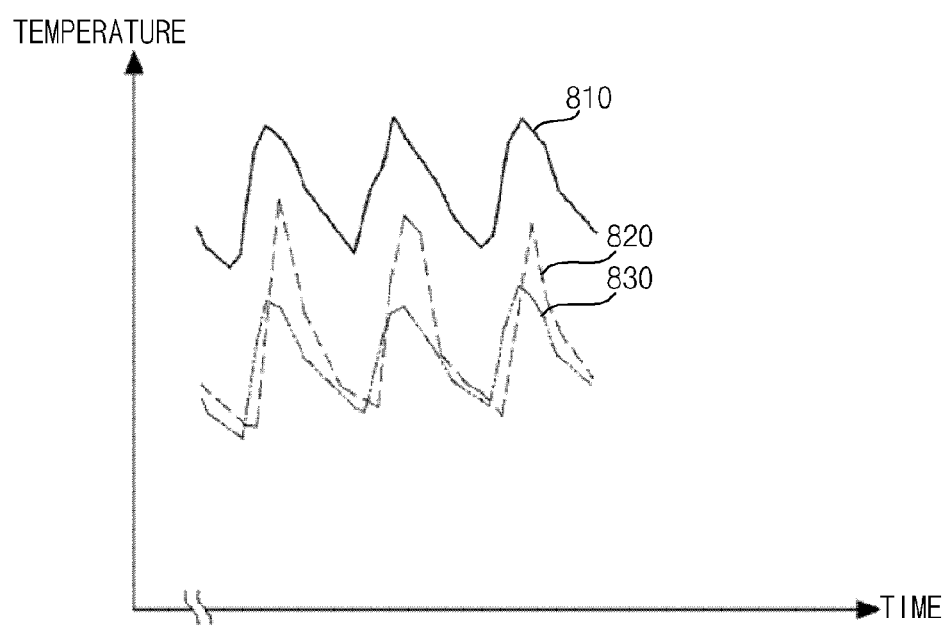

Referring to FIG. 8, even when the same amount of power is supplied to the heater 50 in order to heat the heater 50, the detected temperature of the heater 50 may vary due to manufacturing tolerance of the aerosol-generating device 100, as indicated by the graphs 810, 820, and 830. In consideration thereof, the predetermined threshold temperature is changed based on the temperature of the heater 50, thereby making it possible to prevent carbonization of the wick 40 due to manufacturing tolerance.

Figure 9:
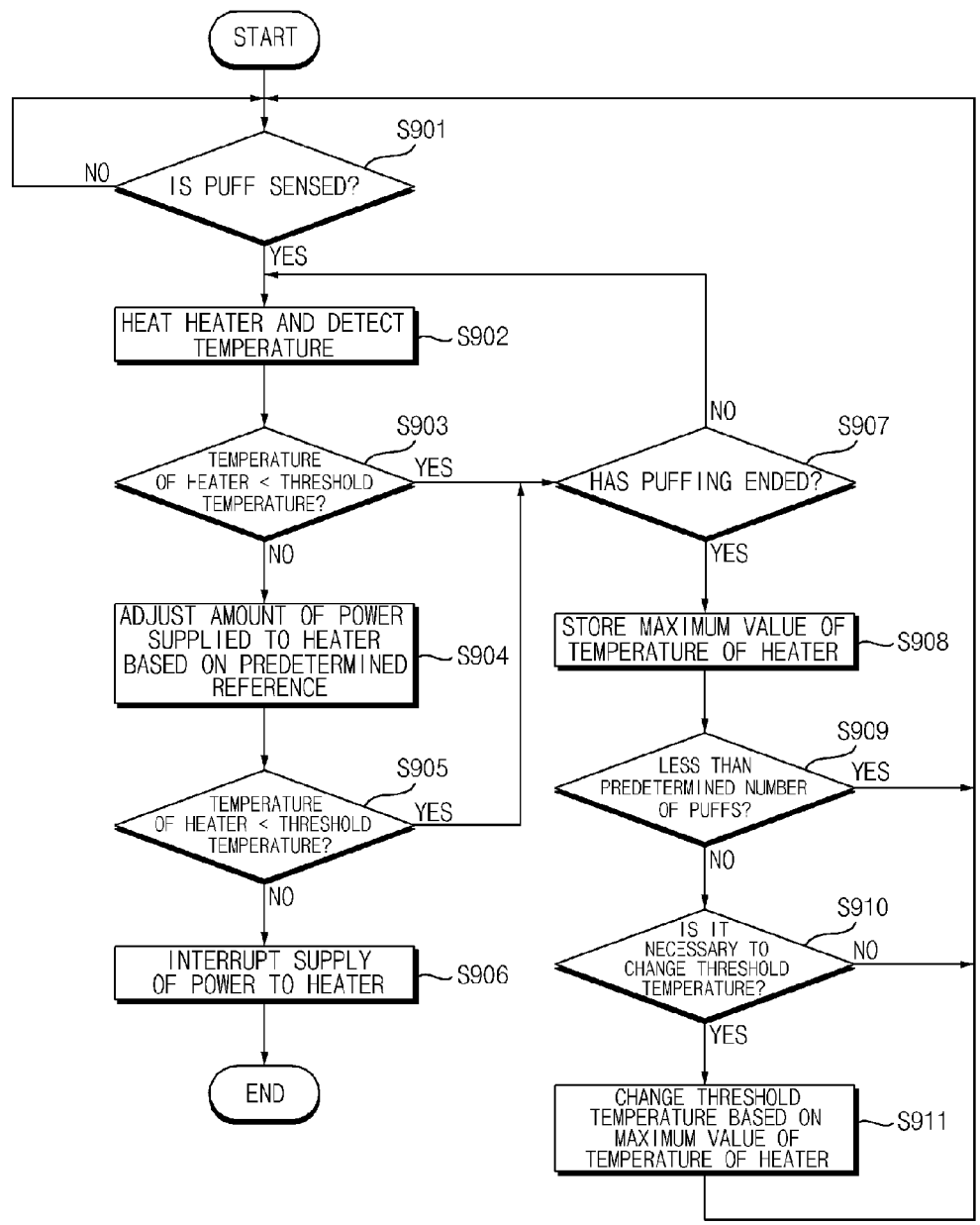

FIG. 9 is a flowchart of an operation method of the aerosol-generating device according to an embodiment of the present disclosure. A detailed description of the same content as that described with reference to FIG. 7 will be omitted.

The aerosol-generating device 100 may monitor whether a puff is sensed using the puff sensor included in the sensor module 150 in operation S901.

When a puff is sensed, the aerosol-generating device 100 may heat the heater 50, and may detect the temperature of the heater 50 in operation S902.

The aerosol-generating device 100 may determine whether the detected temperature of the heater 50 is lower than the predetermined threshold temperature in operation S903.

When the detected temperature of the heater 50 is equal to or higher than the predetermined threshold temperature, the aerosol-generating device 100 may adjust the amount of power that is supplied to the heater 50 based on a predetermined reference in operation S904. For example, when the detected temperature of the heater 50 is equal to or higher than the predetermined threshold temperature, the aerosol-generating device 100 may reduce the amount of power that is supplied to the heater 50 by a predetermined ratio (e.g. 10%).

After the amount of power that is supplied to the heater 50 is adjusted, the aerosol-generating device 100 may detect the temperature of the heater 50, and may determine whether the temperature of the heater 50 is lower than the predetermined threshold temperature in operation S905.

When the temperature of the heater 50 is equal to or higher than the predetermined threshold temperature even after the amount of power that is supplied to the heater 50 is adjusted, the aerosol-generating device 100 may determine that the aerosol-generating substance contained in the cartridge 20 has been exhausted, and may interrupt the supply of power to the heater 50 in operation S906.

When the detected temperature of the heater 50 is lower than the predetermined threshold temperature, the aerosol-generating device 100 may determine whether the puffing ends using the puff sensor included in the sensor module 150 in operation S907.

The aerosol-generating device 100 may heat the heater 50 until the puffing ends, and may detect the temperature of the heater 50.

When the puffing ends, the aerosol-generating device 100 may store the maximum value of the temperature of the heater 50, detected while puffs are sensed, in the memory 140 in operation S908.

The aerosol-generating device 100 may determine whether the number of puffs taken by the user is less than a predetermined number of puffs in operation S909. For example, the aerosol-generating device 100 may determine whether the number of puffs counted from the time of sensing of the first puff is less than a predetermined number of puffs (e.g. 5 times).

When the number of sensed puffs is equal to or greater than the predetermined number of puffs, the aerosol-generating device 100 may determine whether it is necessary to change the predetermined threshold temperature in operation S910.

When it is necessary to change the predetermined threshold temperature, the aerosol-generating device 100 may change the threshold temperature based on the detected temperature of the heater 50 in operation S911.

Figure 10:
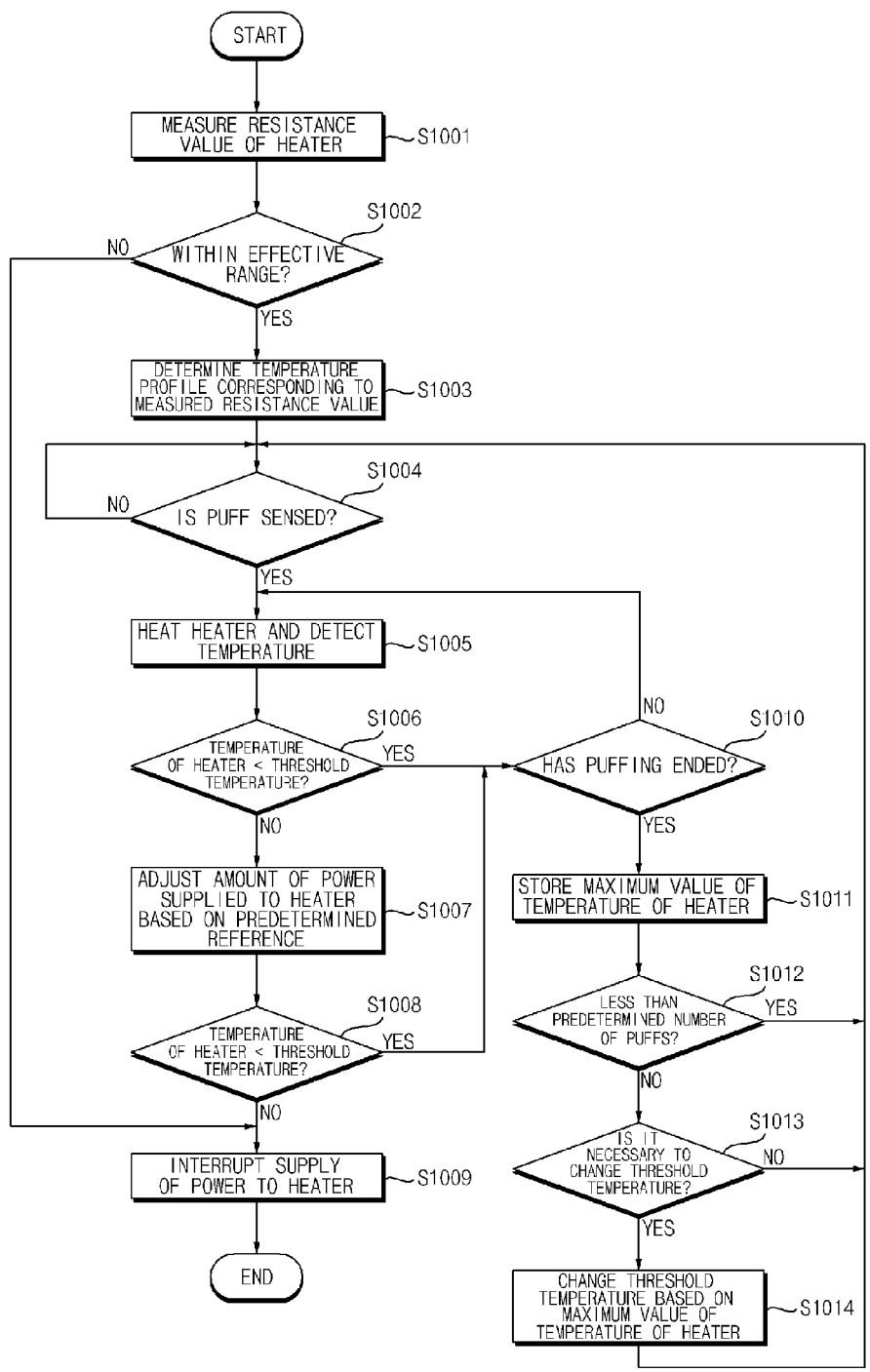

FIG. 10 is a flowchart of an operation method of the aerosol-generating device according to an embodiment of the present disclosure. A detailed description of the same content as that described with reference to FIGS. 7 and 9 will be omitted.

Referring to FIG. 10, the aerosol-generating device 100 may measure the resistance value of the heater 50 in operation S1001. For example, the aerosol-generating device 100 may measure the resistance value of the heater 50 based on the result of measuring the electrical characteristics (e.g. voltage, current, or power) of the heater 50.

At this time, the aerosol-generating device 100 may measure the resistance value of the heater 50 before power is supplied to the heater 50, that is, before the heater 50 is heated. Since the resistance value of the heater 50 is correlated with the temperature of the heater 50, it is possible to more accurately recognize variance in the resistance of the heater 50 by measuring the resistance value before the heater 50 is heated, thus improving the precision of control of the heater 50.

The aerosol-generating device 100 may determine whether the measured resistance value of the heater 50 is within a predetermined effective range in operation S1002. Here, the predetermined effective range may be a resistance value range within which the heater 50 can be heated normally to a target temperature based on the temperature profile stored in the memory 140.

When the measured resistance value of the heater 50 is within the predetermined effective range, the aerosol-generating device 100 may determine a temperature profile corresponding to the measured resistance value of the heater 50 from among a plurality of temperature profiles stored in the memory 140 in operation S1003.

According to an embodiment, the plurality of temperature profiles stored in the memory may include the value of power that is supplied to the heater 50 so that the temperature of the heater 50 reaches the target temperature within a predetermined amount of time from the time of start of the supply of power to the heater 50, irrespective of variance in the resistance value of the heater 50.

In an embodiment, the plurality of temperature profiles stored in the memory may include predetermined power values, which respectively correspond to a plurality of resistance values preset for the heater 50. For example, when the resistance value of the heater 50 is measured to be a first resistance value, a temperature profile based on which a first amount of power is supplied to the heater 50 may be selected, and when the resistance value of the heater 50 is measured to be a second resistance value, a temperature profile based on which a second amount of power is supplied to the heater 50 may be selected.

The relationship between the resistance value of the heater 50 and the amount of power supplied to the heater 50 may be stored in the form of a lookup table. When the resistance value of the heater 50 is measured, the aerosol-generating device 100 may identify the power value associated with the resistance value with reference to the lookup table, and may perform control such that an amount of power corresponding to the identified power value is supplied to the heater 50.

According to an embodiment, the preset power values included in each of the temperature profiles may include individual power values set according to detected inhalations. The inhalations may be counted during a heating operation period of one cycle, in which a predetermined number of inhalations is repeated, or may be counted over the whole life of the cartridge 20. For example, when the resistance value of the heater 50 is measured to be a first resistance value, a temperature profile based on which a first amount of power is suppled when a first inhalation is detected, based on which a second amount of power is supplied when a second inhalation is detected, and based on which a third amount of power is supplied when a third inhalation is detected may be selected. When the resistance value of the heater 50 is measured to be a second resistance value, a temperature profile based on which a fourth amount of power is suppled when a first inhalation is detected, based on which a fifth amount of power is supplied when a second inhalation is detected, and based on which a sixth amount of power is supplied when a third inhalation is detected may be selected.

The aerosol-generating device 100 may monitor whether a puff is sensed using the puff sensor included in the sensor module 150 in operation S1004.

When a puff is sensed, the aerosol-generating device 100 may heat the heater 50, and may detect the temperature of the heater 50 in operation S1005.

The aerosol-generating device 100 may determine whether the detected temperature of the heater 50 is lower than a predetermined threshold temperature in operation S1006.

When the detected temperature of the heater 50 is equal to or higher than the predetermined threshold temperature, the aerosol-generating device 100 may adjust the amount of power that is supplied to the heater 50 based on a predetermined reference in operation S1007.

After the amount of power that is supplied to the heater 50 is adjusted, the aerosol-generating device 100 may detect the temperature of the heater 50, and may determine whether the temperature of the heater 50 is lower than the predetermined threshold temperature in operation S1008.

When the measured resistance value of the heater 50 is not within a predetermined effective range, or when the temperature of the heater 50 is equal to or higher than the predetermined threshold temperature even after the amount of power that is supplied to the heater 50 is adjusted, the aerosol-generating device 100 may determine that the aerosol-generating substance contained in the cartridge 20 has been exhausted, and may interrupt the supply of power to the heater 50 in operation S1009.

When the detected temperature of the heater 50 is lower than the predetermined threshold temperature, the aerosol-generating device 100 may determine whether the puffing ends using the puff sensor included in the sensor module 150 in operation S1010.

When the puffing ends, the aerosol-generating device 100 may store the maximum value of the temperature of the heater 50, detected while puffs are sensed, in the memory 140 in operation S1011.

The aerosol-generating device 100 may determine whether the number of puffs taken by the user is less than a predetermined number of puffs in operation S1012.

When the number of sensed puffs is equal to or greater than the predetermined number of puffs, the aerosol-generating device 100 may determine whether it is necessary to change the predetermined threshold temperature in operation S1013.

When it is necessary to change the predetermined threshold temperature, the aerosol-generating device 100 may change the threshold temperature based on the detected temperature of the heater 50 in operation S1014.

As described above, according to at least one of the embodiments of the present disclosure, it is possible to prevent carbonization of the wick 40 due to heating by the heater 50 even when the amount of aerosol-generating substance that is absorbed in the wick 40 varies due to manufacturing tolerance.

According to at least one of the embodiments of the present disclosure, it is possible to heat the heater 50 to a desired temperature in spite of variance in the resistance value of the heater 50 due to manufacturing tolerance.

Referring to FIGS. 1 to 10, an aerosol-generating device 100 in accordance with one aspect of the present disclosure may include a wick 40 configured to absorb an aerosol-generating substance, a heater 50 configured to heat the wick 40, a sensor configured to sense a puff, and a controller 170. The controller 170 may perform control to heat the heater 50 while puffs are sensed, and may detect the temperature of the heater 50. When the temperature of the heater 50 is equal to or higher than a predetermined threshold temperature, the controller 170 may interrupt the supply of power to the heater 50. When the temperature of the heater 50 is lower than the threshold temperature, the controller 170 may determine whether it is necessary to change the threshold temperature. When it is necessary to change the threshold temperature, the controller 170 may change the threshold temperature based on the detected temperature of the heater 50.

In addition, in accordance with another aspect of the present disclosure, when the temperature of the heater 50 is equal to or higher than the threshold temperature, the controller 170 may perform control to reduce an amount of power that is supplied to the heater 50 based on a predetermined reference. When the temperature of the heater 50 is equal to or higher than the threshold temperature after the amount of power that is supplied to the heater 50 is reduced, the controller 170 may interrupt the supply of power to the heater 50.

In addition, in accordance with another aspect of the present disclosure, the controller 170 may count the number of puffs from the time of sensing of the first puff. When the number of puffs is equal to or greater than a predetermined reference number, the controller 170 may determine whether it is necessary to change the threshold temperature.

In addition, in accordance with another aspect of the present disclosure, the aerosol-generating device may further include a memory 140. When the puffing ends, the controller 170 may store the maximum value of the temperature of the heater 50, detected while the puffs are sensed, in the memory 140, and may change the threshold temperature based on the maximum value of the temperature of the heater 50 stored in the memory 140.

In addition, in accordance with another aspect of the present disclosure, among maximum values stored corresponding to the number of puffs in the memory 140, when the number of maximum values, each of which is different from the threshold temperature by a predetermined temperature difference or less, is equal to or greater than a predetermined number, the controller 170 may determine that it is necessary to change the threshold temperature.

In addition, in accordance with another aspect of the present disclosure, the controller 170 may change the threshold temperature to the largest maximum value among the maximum values stored corresponding to the number of puffs in the memory 140.

In addition, in accordance with another aspect of the present disclosure, the controller 170 may change the threshold temperature to a representative value of the maximum values stored corresponding to the number of puffs in the memory 140.

In addition, in accordance with another aspect of the present disclosure, the aerosol-generating device may further include a memory 140 configured to store a plurality of temperature profiles. The controller 170 may measure the resistance value of the heater 50 before power is supplied to the heater 50, may determine a temperature profile corresponding to the measured resistance value from among the plurality of temperature profiles, and may perform control to heat the heater 50 according to the determined temperature profile.

In addition, in accordance with another aspect of the present disclosure, when the measured resistance value is not within a predetermined effective range, the controller 170 may interrupt the supply of power to the heater 50.

An operation method of an aerosol-generating device 100 in accordance with one aspect of the present disclosure may include heating a heater 50 of the aerosol-generating device to heat a wick 40 absorbing an aerosol-generating substance while puffs are sensed, detecting the temperature of the heater 50, interrupting the supply of power to the heater 50 when the temperature of the heater 50 is equal to or higher than a predetermined threshold temperature, determining whether it is necessary to change the threshold temperature when the temperature of the heater 50 is lower than the threshold temperature, and changing the threshold temperature based on the detected temperature of the heater 50 when it is necessary to change the threshold temperature.

Certain embodiments or other embodiments of the disclosure described above are not mutually exclusive or distinct from each other. Any or all elements of the embodiments of the disclosure described above may be combined with another or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An aerosol-generating device comprising:
    a wick configured to absorb an aerosol-generating substance;
    a heater configured to heat the wick;
    a sensor configured to sense a puff of the aerosol-generating device; and
    a controller configured to:
    perform control to heat the heater in response to a sensed puff,
    detect a temperature of the heater,
    based on the detected temperature of the heater being equal to or higher than a predetermined threshold temperature, interrupt supply of power to the heater,
    based on the detected temperature of the heater being lower than the threshold temperature, determine whether it is necessary to change the predetermined threshold temperature, and
    based on a determination that it is necessary to change the predetermined threshold temperature, change the threshold temperature based on the detected temperature of the heater,
    wherein the predetermined threshold temperature is a temperature at which the wick is carbonized.

2. The aerosol-generating device according to claim 1, wherein an amount of power being supplied to the heater is reduced based on a predetermined reference before interrupting the supply of power to the heater based on the detected temperature of the heater being equal to or higher than a predetermined threshold temperature.

3. The aerosol-generating device according to claim 1, wherein the determination of whether it is necessary to change the threshold temperature is based on a number of sensed puffs being greater than or equal to a predetermined reference number.

4. The aerosol-generating device according to claim 3, further comprising:
    a memory,
    wherein the controller is configured to:
    store, in the memory, a maximum value of a temperature of the heater detected while puffs are sensed, and
    wherein the threshold temperature is changed based on the maximum value of the temperature of the heater stored in the memory.

5. The aerosol-generating device according to claim 4, wherein the memory is configured to store a plurality of maximum values corresponding to the sensed puffs, and
    wherein the determination of whether it is necessary to change the threshold temperature is further based on there being at least a predetermined number of maximum values of the plurality of maximum values being different from the predetermined threshold temperature by a predetermined temperature difference or less.

6. The aerosol-generating device according to claim 4, wherein the memory is configured to store a plurality of maximum values corresponding to the sensed puffs, and the predetermined threshold temperature is changed to a largest maximum value among the stored plurality of maximum values.

7. The aerosol-generating device according to claim 4, wherein the memory is configured to store a plurality of maximum values corresponding to the sensed puffs, and the predetermined threshold temperature is changed to a representative value of the stored plurality of maximum values.

8. The aerosol-generating device according to claim 1, further comprising:
a memory configured to store a plurality of temperature profiles,
wherein the controller is configured to:
measure a resistance value of the heater before power is supplied to the heater, and
determine a temperature profile corresponding to the measured resistance value from among the stored plurality of temperature profiles,
wherein the heater is heated according to the determined temperature profile.

9. The aerosol-generating device according to claim 8, wherein, based on the measured resistance value not being within a predetermined effective range, the controller is configured to interrupt supply of power to the heater.

10. An operation method of an aerosol-generating device, the method comprising:
heating a heater of the aerosol-generating device to heat a wick absorbing an aerosol-generating substance in response to a sensed puff;
detecting a temperature of the heater;
based on the detected temperature of the heater being equal to or higher than a predetermined threshold temperature, interrupting supply of power to the heater;
based on the detected temperature of the heater being lower than the threshold temperature, determining whether it is necessary to change the predetermined threshold temperature; and
based on a determination that it is necessary to change the predetermined threshold temperature, changing the threshold temperature based on the detected temperature of the heater,
wherein the predetermined threshold temperature is a temperature at which the wick is carbonized.

* * * * *